(12) United States Patent
Liu (10) Patent No.: US 9,319,970 B2
(45) Date of Patent: Apr. 19, 2016

(54) METHOD, APPARATUS, AND SYSTEM FOR SEARCHING AND SELECTING NETWORK

(71) Applicant: Huawei Technologies Co., Ltd., Shenzhen (CN)

(72) Inventor: Jiwu Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 13/764,430

(22) Filed: Feb. 11, 2013

(65) Prior Publication Data

US 2014/0057629 A1    Feb. 27, 2014

(30) Foreign Application Priority Data

Feb. 17, 2012 (CN) .......................... 2012 1 0036961

(51) Int. Cl.
   *H04Q 7/20*   (2006.01)
   *H04W 48/16*  (2009.01)
   *H04W 48/18*  (2009.01)

(52) U.S. Cl.
   CPC .............. *H04W 48/16* (2013.01); *H04W 48/18* (2013.01)

(58) Field of Classification Search
   CPC ............................. H04W 88/06; H04W 48/18
   USPC ........................................ 455/456.1–456.6
   See application file for complete search history.

(56) References Cited

U.S. PATENT DOCUMENTS

| | | | |
|---|---|---|---|
| 7,171,216 B1 * | 1/2007 | Choksi | 455/456.1 |
| 2007/0275717 A1 | 11/2007 | Edge et al. | |
| 2008/0250142 A1 | 10/2008 | Magnusson et al. | |
| 2010/0093340 A1 | 4/2010 | Buracchini et al. | |
| 2012/0258715 A1 * | 10/2012 | Souissi et al. | 455/436 |

FOREIGN PATENT DOCUMENTS

| | | |
|---|---|---|
| CN | 101784092 A | 7/2010 |
| CN | 102333360 A | 1/2012 |
| WO | WO 2010/097293 A1 | 9/2010 |

* cited by examiner

*Primary Examiner* — Kwasi Karikari
*Assistant Examiner* — Randy Peaches
(74) *Attorney, Agent, or Firm* — Brinks Gilson & Lione (57) ABSTRACT

Embodiments of the present invention disclose a method, an apparatus, and a system for searching and selecting a network, relate to the field of radio transmission, and can reduce the execution time and cost for searching and selecting a network. The method according to the present invention includes: acquiring information about a current location of a terminal and radio network information about the location; if it is obtained that multiple radio networks exist at the current location of the terminal according to the radio network information about the location, selecting a network among all radio networks that exist at the current location of the terminal according to a preset network selection rule; and camping on the selected radio network. The present invention is applicable to network search and selection.

15 Claims, 9 Drawing Sheets

METHOD, APPARATUS, AND SYSTEM FOR SEARCHING AND SELECTING NETWORK

CROSS-REFERENCE TO RELATED APPLICATIONS

This application claims priority to Chinese Patent Application No. 201210036961.9, filed on Feb. 17, 2012, which is hereby incorporated by reference in its entirety.

FIELD OF THE INVENTION

The present invention relates to the field of radio communications, and in particular to a method, an apparatus, and a system for searching and selecting a network.

BACKGROUND OF THE INVENTION

Network search technology is a necessary technology for various radio network devices to ensure network quality for a user in actual applications. Whether quick network search may be performed and a proper network is selected will affect user experience of a user.

Background network search technology is one of the major network search technologies that have been applied in recent years. Background network search technology means that a terminal searches radio networks at its location according to an instruction operation of a user or a preset instruction for automatic network search when the normal services of the terminal are not affected. During network search, the terminal needs to search radio networks (mainly involving frequency bands and points of radio networks) at its location one by one to obtain information about all radio networks at its location, select a network among the obtained radio network information, and camp on the selected network. When no radio network exists in the area where the terminal is located, the terminal will still perform periodical network search until it acquires a radio network.

During the implementation of the present invention, the inventor discovers at least the following disadvantages in the prior art:

In the prior art, all radio networks at the location need to be searched, which requires consumption of much time and electrical energy of the terminal. When no radio network exists, the terminal will still perform periodical network search, further consuming electrical energy of the terminal and resulting in high cost of network search and selection by the terminal.

SUMMARY OF THE INVENTION

Embodiments of the present invention provide a method, an apparatus, and a system for searching and selecting a network to reduce the electrical energy consumed in searching and selecting a network, and reduce the cost for searching and selecting a network.

To meet the objectives, the embodiments of the present invention adopt the following technical solutions:

A method for searching and selecting a network includes:
  acquiring information about a current location of a terminal and radio network information about the location;
  if it is obtained that multiple radio networks exist at the current location of the terminal according to the radio network information about the location, selecting a network among all radio networks that exist at the current location of the terminal according to a preset network selection rule; and
  camping on the selected radio network.

A method for searching and selecting a network includes:
  acquiring information about a current location of a terminal and radio network information about the location from a stored electronic map according to terminal trigger or regularly, where the electronic map includes a specified area of the current location of the terminal; and
  sending the information about the current location of the terminal and the radio network information about the location to the terminal.

A device for searching and selecting a network includes:
  a first receiving module, configured to acquire information about a current location of a terminal and radio network information about the location;
  a selecting module, configured to: if it is obtained that multiple radio networks exist at the current location of the terminal according to the radio network information about the location, select a network among all radio networks that exist at the current location of the terminal according to a preset network selection rule; and
  a camping module, configured to camp on the selected radio network.

A navigation device includes:
  a positioning module, configured to: acquire information about a current location of a terminal and radio network information about the location from a stored electronic map according to terminal trigger or regularly, where the electronic map includes a specified area of the current location of the terminal; and
  a second sending module, configured to send the information about the current location of the terminal and the radio network information about the location to the terminal.

A system for searching and selecting a network includes the device for searching and selecting a network and the navigation device.

The method, apparatus, and system provided in the embodiments of the present invention can acquire a location of a terminal and radio network information about the location from an electronic map of a navigation device in the terminal, and select a network according to the radio network information, and a navigation server can send information about the current location and radio network information of the location to the terminal. Compared with the prior art, when no radio network exists at the location of a terminal, the embodiments of the present invention can reduce blind network search and network selection by the terminal, thereby reducing the electrical energy consumed by the terminal for searching and selecting a network, and reducing the cost of the terminal for searching and selecting a network.

BRIEF DESCRIPTION OF THE DRAWINGS

To illustrate the technical solutions in the embodiments of the present invention more clearly, the following briefly describes the accompanying drawings required for describing the embodiments of the present invention. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

In order to make the advantages of the technical solutions of the present invention more comprehensible, the present invention is described in detail below with reference to the accompanying drawings and embodiments.

Embodiment 1

Figure 1A:
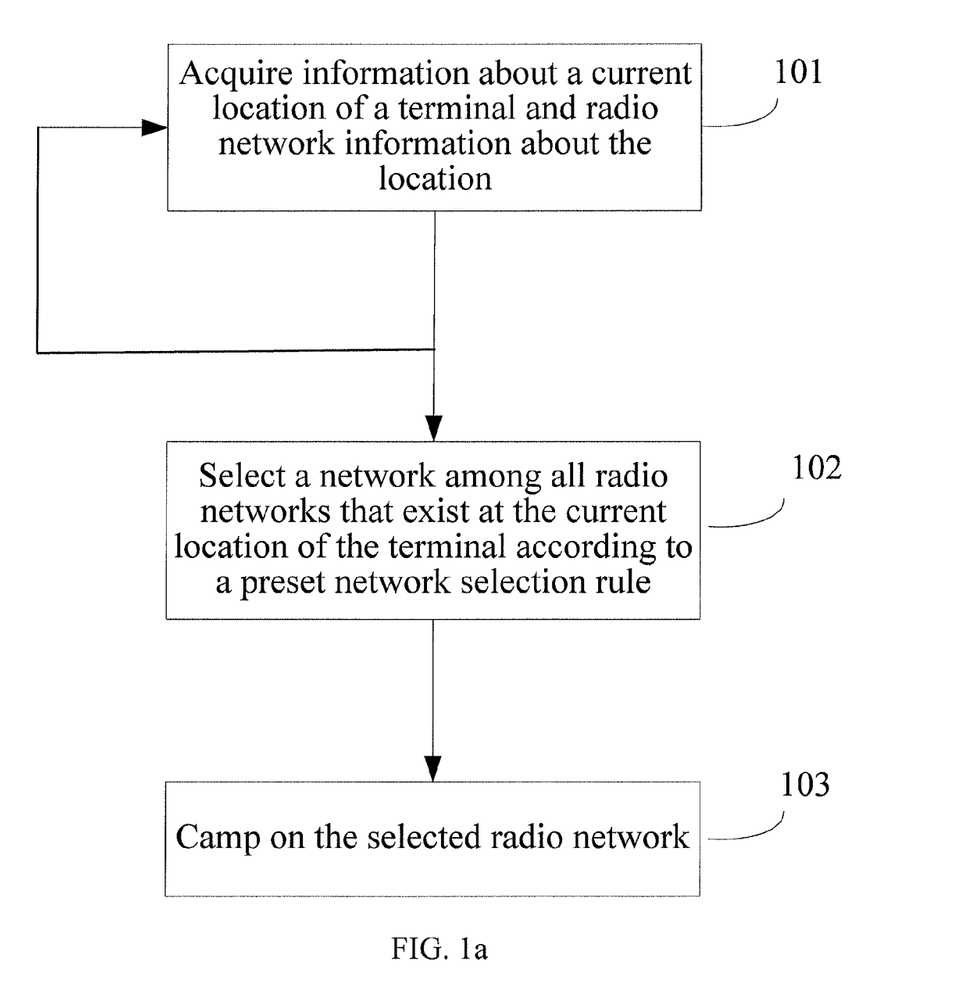
FIG. 1a is a flow chart of a method for searching and selecting a network according to Embodiment 1 of the present invention.

An embodiment of the present invention provides a method for searching and selecting a network. As shown in FIG. 1a, the method includes:

Step 101: Acquire information about a current location of a terminal and radio network information about the location.

Specifically, in this embodiment, the current location of the terminal and the radio network information about the location are determined according to user trigger or periodically through a navigation device. In actual applications, user trigger may be a user entering a positioning command to the terminal. After receiving the positioning command, the navigation device in the terminal starts to position and acquire the radio network information about the location. In addition, the navigation device may also regularly perform positioning automatically and acquire the radio network information about the location, and send the information about the current location and the radio network information about the location to the device for searching and selecting a network. In this embodiment, the specific expression form of the device for searching and selecting a network is not restricted. For example, the terminal is a smart phone. Then the device for searching and selecting a network may be a smart network search software program that is installed in the smart phone and is used for searching and selecting a network, and the smart network search software program can acquire the current location of the terminal and radio network information about the location from a navigation map software program (navigation device) to search and select a network. Further, optionally, a data interface for information transmission between the device for searching and selecting a network and the navigation device may be an open interface after standardization to facilitate further development of application software.

In another embodiment of the present invention, network search request information may further be automatically sent to the radio network search device, where the radio network search device is used to perform blind search for radio networks of the current cell where the terminal is located and neighboring cells, and acquire radio network information of the location.

Step 102: If it is obtained that multiple radio networks exist at the current location of the terminal according to the radio network information about the location, select a network among all radio networks that exist at the current location of the terminal according to a preset network selection rule.

Figure 3:
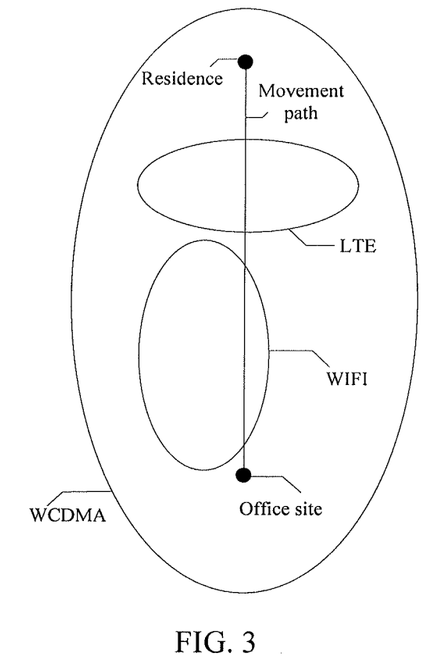
FIG. 3 is a schematic diagram of a specific example of the method for searching and selecting a network according to Embodiment 1 of the present invention.

Specifically, in this embodiment, the device for searching and selecting a network selects a network among all radio networks that exist at the current location of the terminal according to a preset network selection rule. In actual applications, the network selection rule may be set by a user, or a proper network selection rule may also be automatically selected by the device for searching and selecting a network from multiple preset network selection rules stored in the terminal according to radio network conditions at the current location. For example:

The network selection rule may be a priority rule, that is, various radio networks of different types are sorted according to a descending order of priority level. For example, the sorting sequence is GSM-WiFi-LTE-WCDMA. Then the device for searching and selecting a network preferably selects GSM after acquiring radio network information about the current location, and selects WiFi if no GSM is available. The rest is deduced through analogy. The device for searching and selecting a network may also determine a specific area set by a user according to an instruction entered by the user. The specific area is an action range of the user. For example, in actual applications, a user often needs to perform activities in a specific confined area by carrying the terminal. For example, the user may be a salaryman who will carry the mobile phone to and from the office in workdays and perform activities in the specific confined area covered by the path from the residence to the office. The user may enter the position of the residence, position of the office, and specific roads to pass by to and from the work. The mobile phone may perform processing by using the information as the specific area set by the user. For example, as shown in FIG. 3, the specific area includes the residence, office site, and movement path between both. According to the radio network information stored in the navigation device, radio networks that exist in the specific area include WiFi, LTE, and WCDMA, among which only the WCDMA network completely covers the residence, office site, and movement path between both. Then the device for searching and selecting a network may select WCDMA as the camping network.

Further, if it is obtained according to the radio network information about the location that no radio network exists at the current location of the terminal, receive the information about the current location of the terminal and the radio network information about the location sent by the navigation device upon a next user trigger or in a next period. For example, in actual applications, the device for searching and selecting a network acquires radio network information about the location from the navigation device through the corresponding information interface, and judges whether the current location is covered by a radio network. If no radio network exists at the current location, the device for searching and selecting a network may perform no operations until next trigger of the user, or make a judgment after determining the current location of the terminal and the radio network information about the location through the navigation device in the next period. For example, when the terminal is disconnected from the network, the device for searching and selecting a network may first judge whether a network is available at the place according to relevant information in the electronic map; if no, abandon the network search operation, and shut down the hardware devices involved in the network search operation, thereby saving the electric energy.

The embodiment of the present in invention does not restrict the implementation manner for selecting a network among all radio networks that exist at the current location of the terminal according to a preset network selection rule, which may be any implementation manner known to persons skilled in the art.

Step 103: Camp on the selected radio network.

The method according to the embodiment of the present invention can acquire a location of a terminal and radio network information about the location from an electronic map in a navigation device in the terminal, and select a network according to the radio network information. Compared with the prior art, the embodiment of the present invention can reduce blind network search and network selection by the terminal, thereby reducing the electrical energy consumed by the terminal for searching and selecting a network, and reducing the cost of the terminal for searching and selecting a network.

Figure 1B:
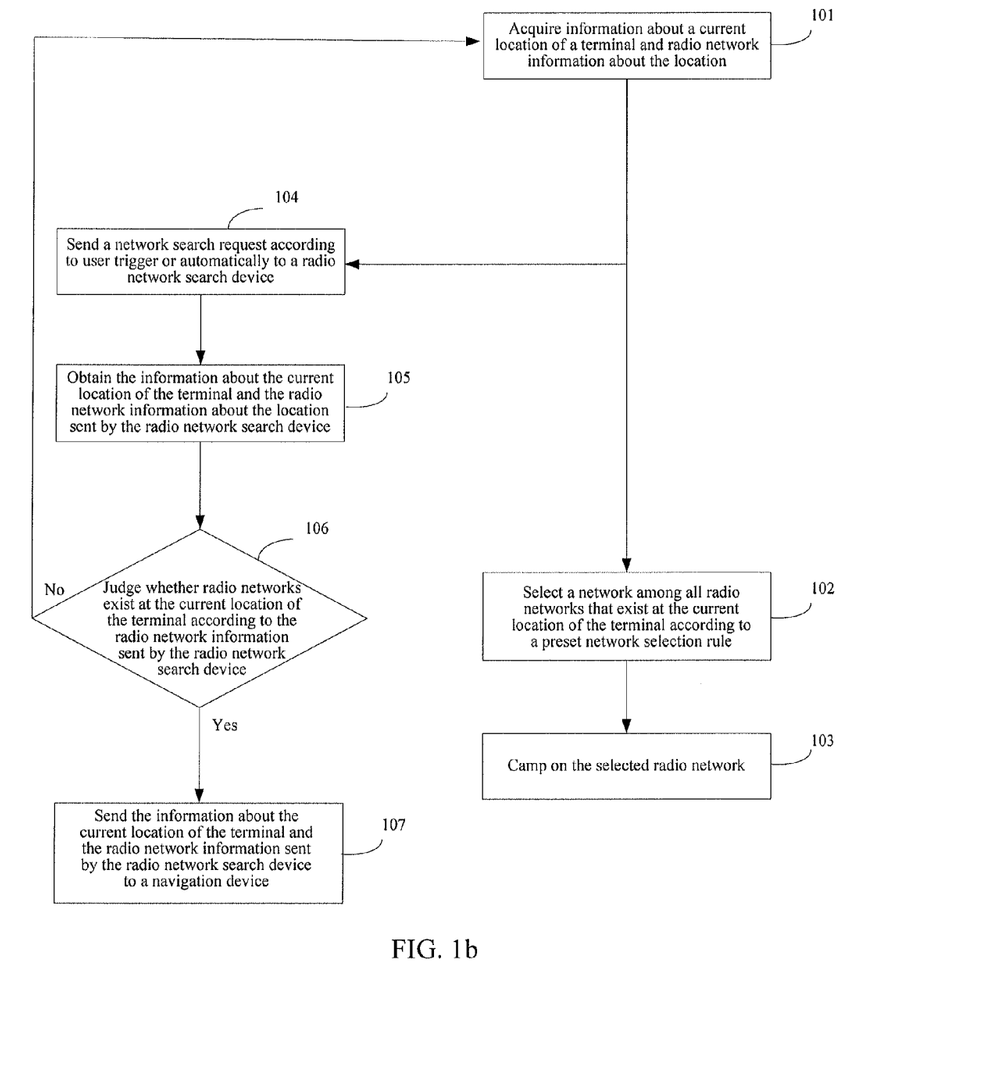
FIG. 1b is a flow chart of the method for searching and selecting a network according to Embodiment 1 of the present invention.

Further, optionally, as shown in FIG. 1*b*, the method for searching and selecting a network by a terminal according to the embodiment of the present invention further includes:

Step 104: If it is obtained according to the radio network information about the location that no radio network exists at the current location of the terminal, send network search request information according to user trigger or automatically to a radio network search device.

The radio network search device is configured to perform blind search for radio networks of a current cell and neighboring cells of the terminal, and acquire radio network information about the location.

Specifically, in this embodiment, if no radio network exists at the current location of the terminal, the device for searching and selecting a network sends network search request information according to user trigger or automatically to a radio network search device. The radio network search device is configured to perform blind search for radio networks of a current cell and neighboring cells of the terminal through the existing technical means, and acquire radio network information about the location. The specific implementation manner of the device for searching and selecting a network in performing blind search for radio networks of the current cell and neighboring cells of the terminal may be any manner known to persons skilled in the art, and is not described herein. Further, optionally, a data interface for information transmission between the device for searching and selecting a network and the radio network search device may be an open interface after standardization to facilitate further development of application software.

Step 105: Obtain the information about the current location of the terminal and the radio network information about the location sent by the radio network search device.

Step 106: Judge whether radio networks exist at the current location of the terminal according to the radio network information sent by the radio network search device.

If it is obtained according to the radio network information about the location that no radio network exists at the current location of the terminal, receive the information about the current location of the terminal and the radio network information about the location sent by the navigation device upon a next user trigger or in a next period.

Step 107: If it is obtained according to the radio network information about the location sent by the radio network search device that radio networks exist at the current location of the terminal, send the information about the current location of the terminal and the radio network information about the location sent by the radio network search device to the navigation device.

The navigation device is configured to send the information about the current location of the terminal and the radio network information about the location sent by the radio network search device to a navigation server. The navigation server is configured to receive the information about the current location of the terminal and the radio network information about the location sent by the radio network search device, and send radio network update information to the navigation device.

Specifically, in this embodiment, if radio networks exist at the current location of the terminal, the device for searching and selecting a network sends the information about the current location of the terminal and the radio network information about the location sent by the radio network search device to a navigation device, so that the navigation device sends the information about the current location of the terminal and the radio network information about the location sent by the radio network search device to a navigation server.

Figure 1C:
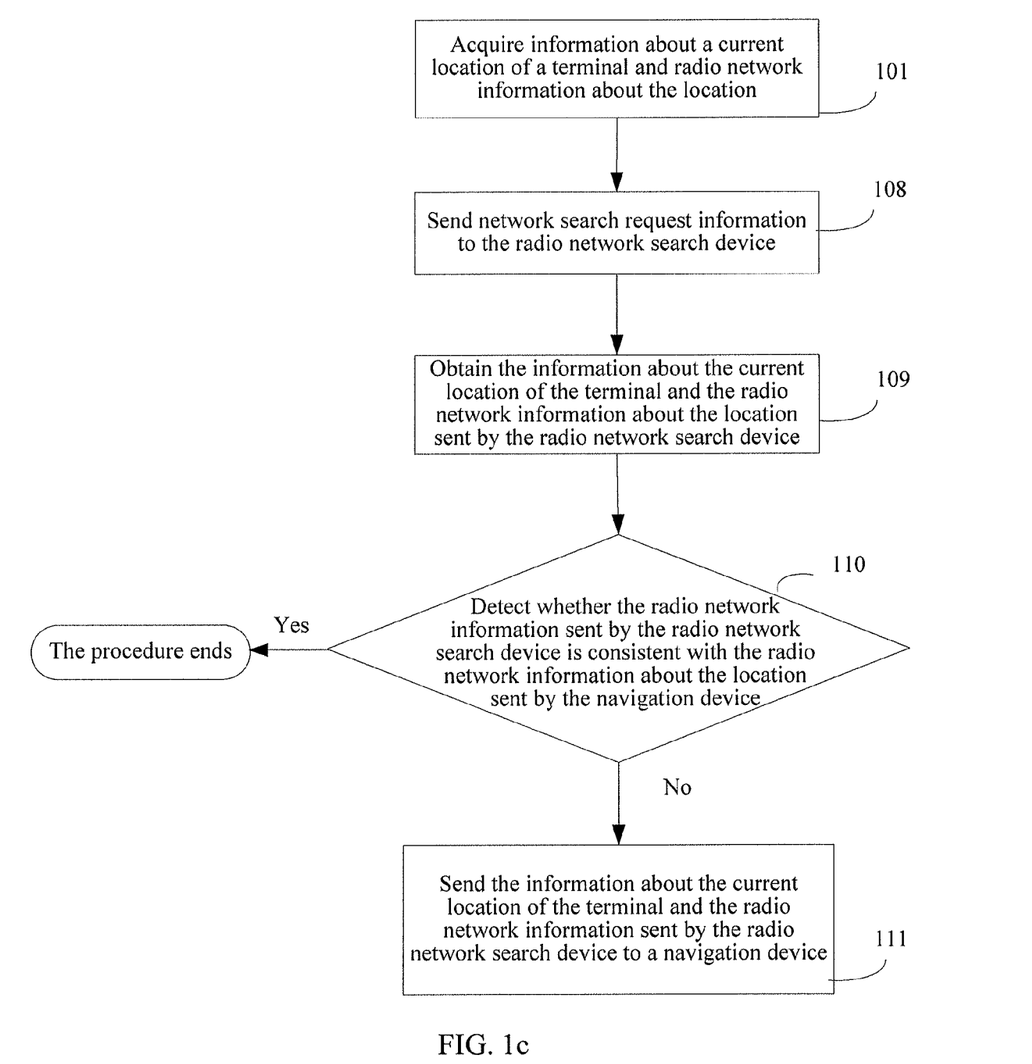
FIG. 1c is a flow chart of the method for searching and selecting a network according to Embodiment 1 of the present invention.

Further, optionally, as shown in FIG. 1*c*, the method for searching and selecting a network by a terminal according to the embodiment of the present invention further includes:

Step 108: After acquiring the information about the current location of the terminal and the radio network information about the location, send network search request information to the radio network search device.

Specifically, in this embodiment, after receiving the information about the current location of the terminal and the radio network information about the location sent by a navigation device, the device for searching and selecting a network sends network search request information to the radio network search device.

Step 109: Obtain the information about the current location of the terminal and the radio network information about the location sent by the radio network search device.

Step 110: Detect whether the radio network information sent by the radio network search device is consistent with the radio network information about the location sent by the navigation device.

Specifically, in this embodiment, the device for searching and selecting a network detects whether the radio network information sent by the radio network search device is consistent with the radio network information about the location sent by the navigation device.

Step 111: If the radio network information sent by the radio network search device and the radio network information about the location sent by the navigation device are inconsistent, send the information about the current location of the terminal and the radio network information about the location sent by the radio network search device to the navigation device.

The navigation device is configured to send the information about the current location of the terminal and the radio network information about the location sent by the radio network search device to a navigation server.

If the radio network information sent by the radio network search device is consistent with the radio network information about the location sent by the navigation device, the device for searching and selecting a network does not perform any operation, and the procedure ends.

The method according to the embodiment of the present invention can acquire radio network information about the location of a terminal through traditional means, compare the radio network information acquired through traditional means with radio network information acquired from the navigation device, and finally send the radio network information about the location of the terminal acquired through traditional means to a navigation server via the navigation device. Compared with the prior art, the embodiment of the present invention may upload latest radio network information about a certain location via the terminal to the navigation server, so that the navigation server sends the latest radio network information to terminals of other users, thereby reducing the cost consumed by other terminals in the system in searching and selecting a network.

Embodiment 2

Figure 2A:
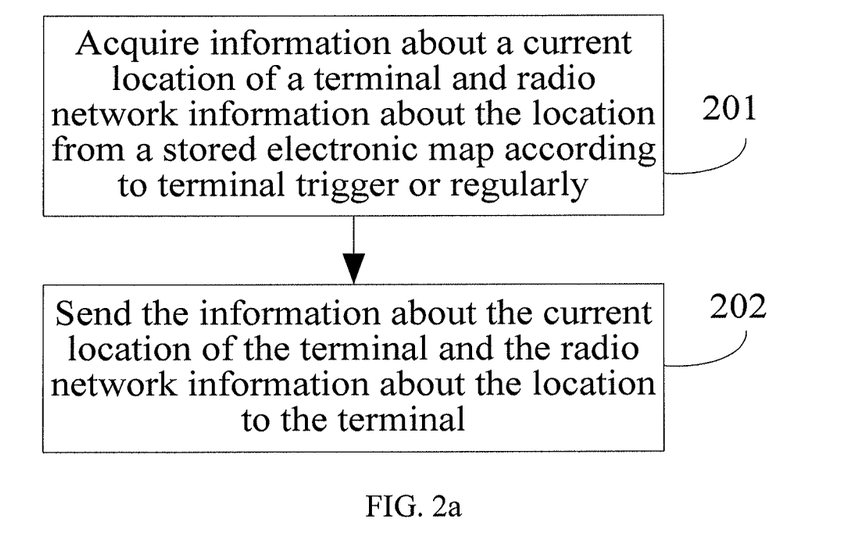
FIG. 2a is a flow chart of a method for searching and selecting a network according to Embodiment 2 of the present invention.

An embodiment of the present invention provides a method for searching and selecting a network. As shown in FIG. 2a, the method includes:

Step 201: Acquire information about a current location of a terminal and radio network information about the location from a stored electronic map according to terminal trigger or regularly.

The electronic map includes a specified area of the current location of the terminal.

Specifically, in this embodiment, the navigation device may be a navigation map software program equipped with a satellite navigation map (electronic map). Radio network information about each site on the map is added to satellite navigation map, for example, network frequency point information, cell ID information, PLMN information, and so on. The navigation device can know the current specific location of the terminal from the satellite navigation map with radio network information, obtain radio network coverage status at this location according to the current specific location of the terminal and radio network information about the location, and thereby acquire all radio network types that cover the location.

For example, the navigation map software program in the terminal knows from the stored satellite navigation map that the current location is A. As the satellite navigation map is added with radio network information, the navigation map software program may further know from the stored satellite navigation map that that radio networks that cover A include WIFI (Wireless-Fidelity, wireless fidelity), GSM (Global System of Mobile communication, global system of mobile communication), LTE (Long Term Evolution, long term evolution), and WCDMA (Wideband Code Division Multiple Access, wideband code division multiple access). Then the current location of the terminal is A, and the radio networks that exist at the location are WIFI, LTE, GSM, and WCDMA.

The navigation device acquires information about the current location of the terminal and radio network information about the location from a stored electronic map according to user trigger or regularly. The user trigger manner and the specific manner for the navigation device in acquiring the information about the current location of the terminal and radio network information about the location from the stored electronic map may be any implementation manners known to persons skilled in the art, and are not restricted herein.

Step 202: Send the information about the current location of the terminal and the radio network information about the location to the terminal.

Specifically, in this embodiment, the navigation device sends the information about the current location of the terminal and the radio network information about this location to the device for searching and selecting a network in the terminal. In this way, the device for searching and selecting a network selects a network according to the information about the current location of the terminal and the radio network information about this location.

According to the method provided in the embodiment of the present invention, the navigation server can send the information about the current location of the terminal and the radio network information about this location to the terminal. Compared with the prior art, the navigation server can send the information about the current location and the radio network information about this location to the terminal, so that the terminal searches a network through the information about the current location and the radio network information about this location, thereby reducing blind network search and selection performed by the terminal, reducing the electrical energy consumed by the terminal in network search and selection, and lowering the cost consumed by the terminal in network search and selection.

Figure 2B:
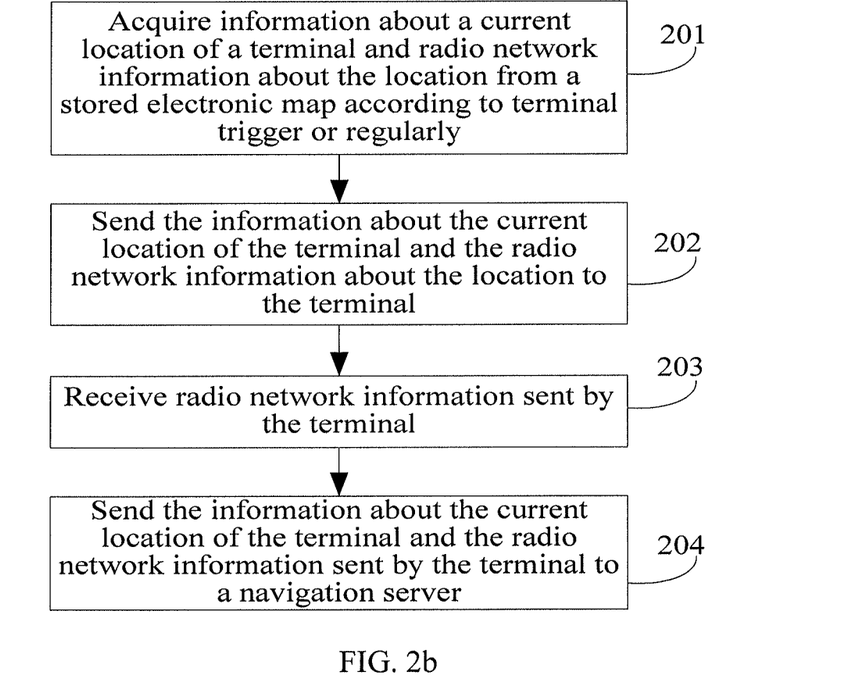
FIG. 2b is a flow chart of the method for searching and selecting a network according to Embodiment 2 of the present invention.

Further, optionally, as shown in FIG. 2b, the method for searching and selecting a network by a terminal according to the embodiment of the present invention further includes:

Step 203: Receive radio network information sent by the terminal.

Specifically, in this embodiment, the navigation device receives the radio network information sent by the device for searching and selecting a network in the terminal. The radio network information sent by the device for searching and selecting a network is acquired by the radio network search device upon blind search for radio networks of the current cell and neighboring cells of the terminal through existing technical means and sent to the device for searching and selecting a network.

Step 204: Send the information about the current location of the terminal and the radio network information sent by the terminal to a navigation server.

Specifically, in this embodiment, the navigation device sends the information about the current location of the terminal and the radio network information sent by the device for searching and selecting a network in the terminal to the navigation server.

Figure 2C:
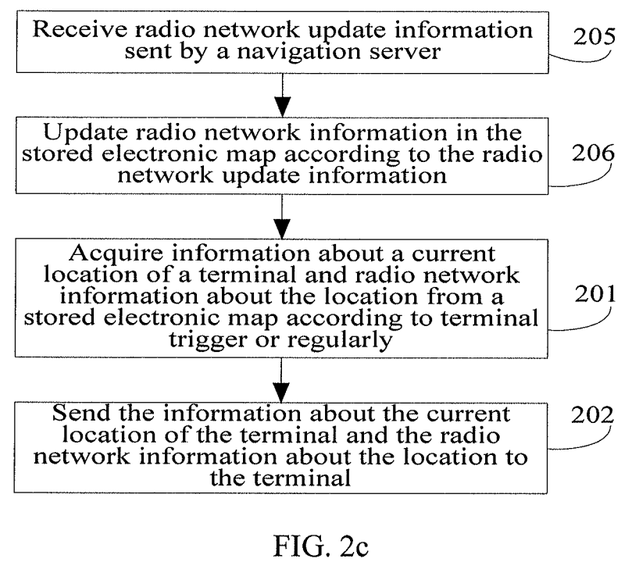
FIG. 2c is a flow chart of the method for searching and selecting a network according to Embodiment 2 of the present invention.

Further, optionally, as shown in FIG. 2c, the method for searching and selecting a network by a terminal according to the embodiment of the present invention further includes:

Step 205: Receive radio network update information sent by a navigation server.

The radio network update information includes radio network information after change about a location whose radio network changes.

Specifically, in this embodiment, the navigation device receives the radio network update information sent by the navigation server. The radio network information stored in the navigation server may be provided by the terminal, or is directly stored by the operator. In one aspect, in actual applications, a radio network operator may regularly or irregularly provide the radio network information to the navigation server. The embodiment of the present invention does not restrict the implementation manner for providing radio network information by the operator for the navigation server, which may be any implementation manner known to persons skilled in the art. In another aspect, in actual applications, all terminals equipped with navigation devices managed by the navigation server may provide radio network information for the navigation server. The specific implementation manner for a terminal in providing radio network information for the navigation server may be:

When a user acquires the current location through the navigation device in the terminal, and knows according to the radio network information about the current location that the radio network at the location is WCDMA. In this case, the terminal may further adopt an existing method through a radio network search and selection software program (that is, radio network search device) in the prior art, including: acquiring radio network information through neighboring cell information of the current camping cell, or directly performing another network search at the location through the radio network search and selection software program to acquire current radio network coverage status at the location. If the result of the another network search is that the location is covered by WCDMA and WIFI, the network search result shall prevail. The navigation device may send the radio network information found by the radio network search device to the navigation server, allowing the radio network information in the navigation server to be updated, so that the navigation server includes the latest radio network information in the radio network update information and sends it to the navigation devices in the terminals of other users.

Step 206: Update radio network information in the stored electronic map according to the radio network update information.

Specifically, in this embodiment, the navigation device updates radio network information in the stored electronic map according to the radio network update information.

The method according to the embodiment of the present invention can send radio network information to a device for searching and selecting a network, and send the radio network information acquired by a radio network search device to the navigation server. Compared with the prior art, the embodiment of the present invention may provide radio network information to the device for searching and selecting a network, thereby reducing the electrical energy consumed by the terminal in searching and selecting a network, and can upload latest radio network information about a certain location to the navigation server, so that the navigation server sends the latest radio network information to terminals of other users, thereby reducing the cost consumed by other terminals in the system in network search and selection.

Embodiment 3

Figure 4A:
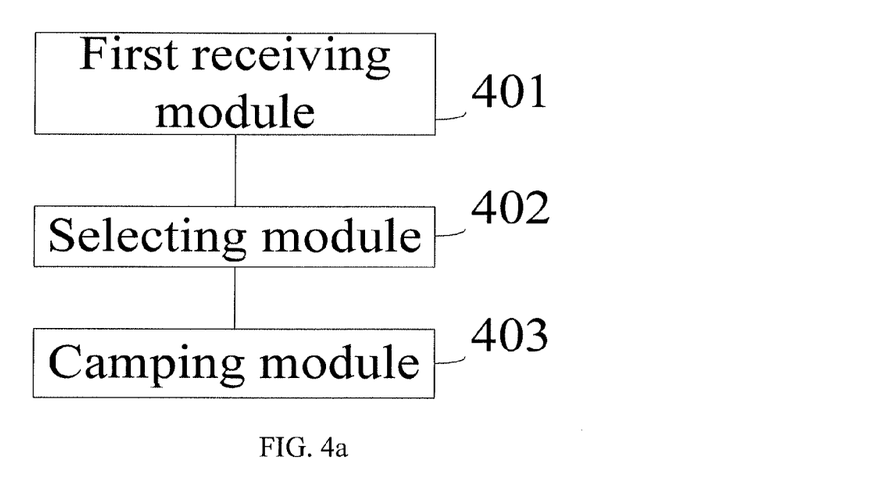
FIG. 4a is a schematic structural diagram of a device for searching and selecting a network according to Embodiment 3 of the present invention.

An embodiment of the present invention provides a device for searching and selecting a network, as shown in FIG. 4a, including:

a first receiving module 401, configured to acquire information about a current location of a terminal and radio network information about the location;

The acquiring information about a current location of a terminal and radio network information about the location may be: receiving the information about the current location of the terminal and the radio network information about the location sent by a navigation device according to user trigger or regularly, where the navigation device stores an electronic map of a specified area that comprises the location and radio network information mapping to the electronic map.

a selecting module 402, configured to: if it is obtained that multiple radio networks exist at the current location of the terminal according to the radio network information about the location, select a network among all radio networks that exist at the current location of the terminal according to a preset network selection rule; and if no radio networks exist at the current location of the terminal, wait for next user trigger or receive the information about the current location of the terminal and radio network information about the location sent by the navigation device in the next period; and a camping module 403, configured to camp on the selected radio network.

The device for searching and selecting a network according to the embodiment of the present invention can acquire a location of a terminal and radio network information about the location from an electronic map in a navigation device in the terminal through a first receiving module, and select a network according to the radio network information through a selecting module. Compared with the prior art, the embodiment of the present invention can reduce blind network search and network selection by the terminal, thereby reducing the electrical energy consumed by the terminal for searching and selecting a network, and reducing the cost of the terminal for searching and selecting a network.

Figure 4B:
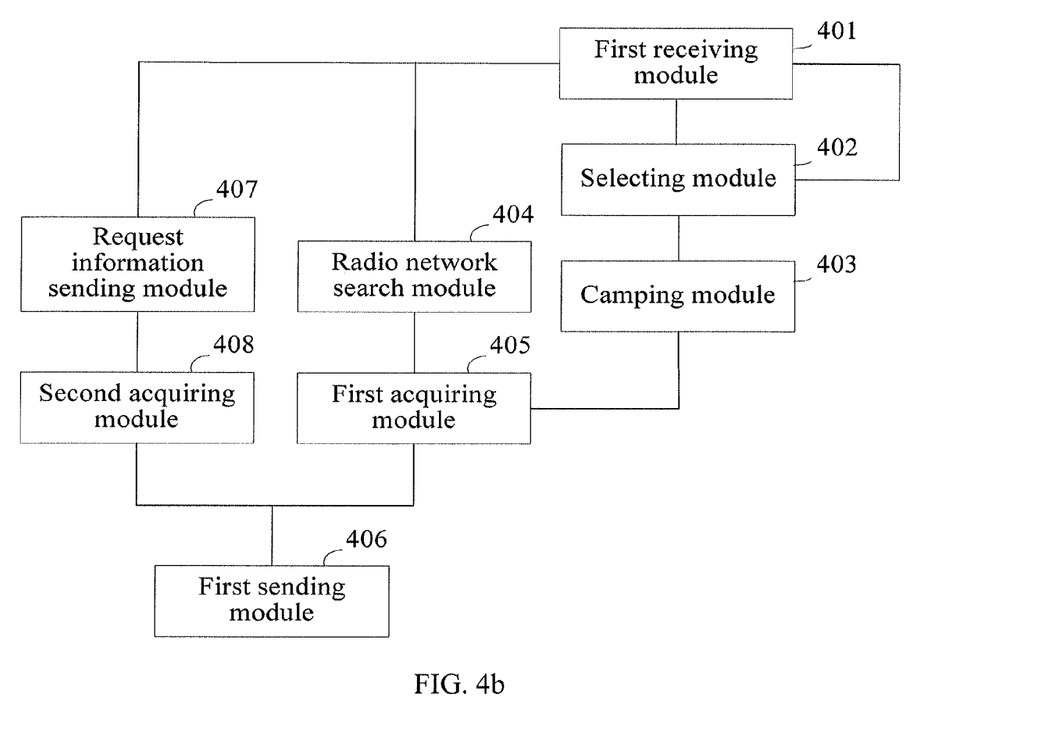
FIG. 4b is a schematic structural diagram of the device for searching and selecting a network according to Embodiment 3 of the present invention.

Further, optionally, as shown in FIG. 4b, the method for searching and selecting a network by a terminal according to the embodiment of the present invention further includes:

a radio network search module 404, configured to: if it is obtained according to the radio network information about the location that no radio network exists at the current location of the terminal, send network search request information according to user trigger or automatically to a radio network search device;

The radio network search device is configured to perform blind search for radio networks of a current cell and neighboring cells of the terminal, and acquire radio network information about the location.

a first acquiring module 405, configured to obtain the information about the current location of the terminal and the radio network information about the location sent by the radio network search device;

If it is obtained according to the radio network information sent by the radio network search device that no radio network exists at the current location of the terminal, wait a next user trigger or receive the information about the current location of the terminal and the radio network information about the location sent by the navigation device in a next period.

a first sending module 406, configured to: if radio networks exist at the current location of the terminal, send the information about the current location of the terminal and the radio network information about the location sent by the radio network search device to a navigation device, so that the navigation device sends the information about the current location of the terminal and the radio network information about the location sent by the radio network search device to a navigation server, where the navigation server is configured to receive the information about the current location of the terminal and the radio network information about the location sent by the radio network search device that are sent by the navigation device, and send radio network update information to the navigation device; or configured to: if the radio network information sent by the radio network search device and the radio network information about the location sent by the navigation device are inconsistent, send the information about the current location of the terminal and the radio network information about the location sent by the radio network search device to the navigation device, so that the navigation device sends the information about the current location of the terminal and the radio network information about the location sent by the radio network search device to a navigation server;

a request information sending module 407, configured to: after acquiring the information about the current location of the terminal and the radio network information about the location, send network search request information to the radio network search device; and a second acquiring module 408, configured to obtain the information about the current location of the terminal and the radio network information about the location sent by the radio network search device.

The device for searching and selecting a network according to the embodiment of the present invention can acquire radio network information about the location of a terminal through a radio network search module, compare the radio network information acquired by the radio network search module with radio network information acquired from the navigation device, and finally send the radio network information about the location of the terminal acquired through traditional means to a navigation server via the navigation device by using a first sending module according to the comparison result. Compared with the prior art, the embodiment of the present invention may upload latest radio network information about a certain location via the terminal to the navigation server, so that the navigation server sends the latest radio network information to terminals of other users, thereby reducing the cost consumed by other terminals in the system in searching and selecting a network.

Embodiment 4

Figure 5A:
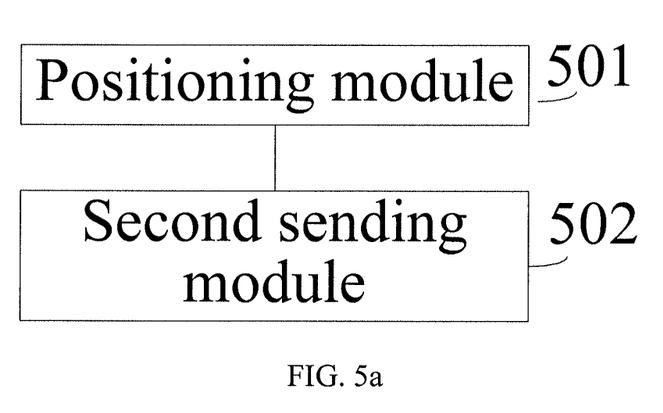
FIG. 5a is a schematic structural diagram of a navigation device according to Embodiment 4 of the present invention.

An embodiment of the present invention provides a navigation device. As shown in FIG. 5*a*, the apparatus includes:

a positioning module 501, configured to acquire information about a current location of a terminal and radio network information about the location from a stored electronic map according to terminal trigger or regularly; and The electronic map includes a specified area of the current location of the terminal.

a second sending module 502, configured to send the information about the current location of the terminal and the radio network information about the location to the terminal.

According to the navigation device provided in the embodiment of the present invention, the navigation server can send the information about the current location of the terminal and the radio network information about this location to the terminal through a second sending module. Compared with the prior art, the navigation server can send the information about the current location and the radio network information about this location to the terminal, so that the terminal searches a network through the information about the current location and the radio network information about this location, thereby reducing blind network search and selection performed by the terminal, reducing the electrical energy consumed by the terminal in network search and selection, and lowering the cost consumed by the terminal in network search and selection.

Figure 5B:
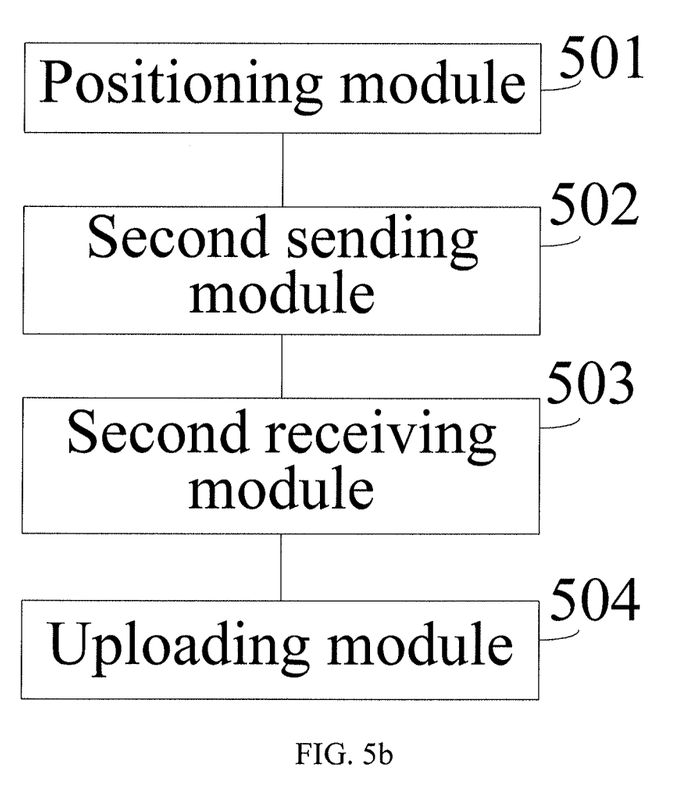
FIG. 5b is a schematic structural diagram of the navigation device according to Embodiment 4 of the present invention.

Further, optionally, as shown in FIG. 5*b*, the method for searching and selecting a network by a terminal according to the embodiment of the present invention further includes:

a second receiving module 503, configured to: after the sending the information about the current location of the terminal and the radio network information about the location to the terminal, receive radio network information sent by the device for searching and selecting a network; and an uploading module 504, configured to send the information about the current location of the terminal and the radio network information sent by the terminal to a navigation server.

Figure 5C:
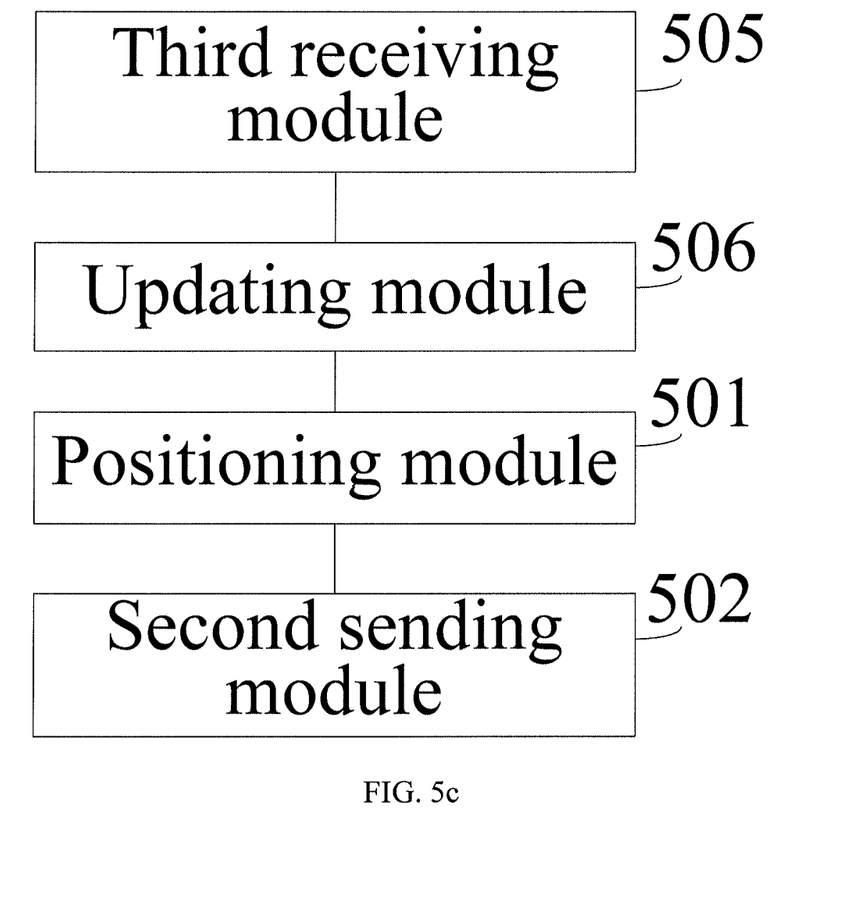
FIG. 5c is a schematic structural diagram of the navigation device according to Embodiment 4 of the present invention.

Further, optionally, as shown in FIG. 5*c*, the method for searching and selecting a network by a terminal according to the embodiment of the present invention further includes:

a third receiving module 505, configured to before acquiring information about a current location of a terminal and radio network information about the location from a stored electronic map according to terminal trigger or regularly, receive radio network update information sent by the navigation server; and The radio network update information includes radio network information after change about a location whose radio network changes.

an updating module 506, configured to update radio network information in the stored electronic map according to the radio network update information.

The navigation device according to the embodiment of the present invention can send the radio network information acquired by the radio network search device through an uploading module to the navigation server. Compared with the prior art, the embodiment of the present invention may provide radio network information to the device for searching and selecting a network, thereby reducing the electrical energy consumed by the terminal in searching and selecting a network, and can upload latest radio network information about a certain location to the navigation server, so that the navigation server sends the latest radio network information to terminals of other users, thereby reducing the cost consumed by other terminals in the system in network search and selection.

Embodiment 5

Figure 6:
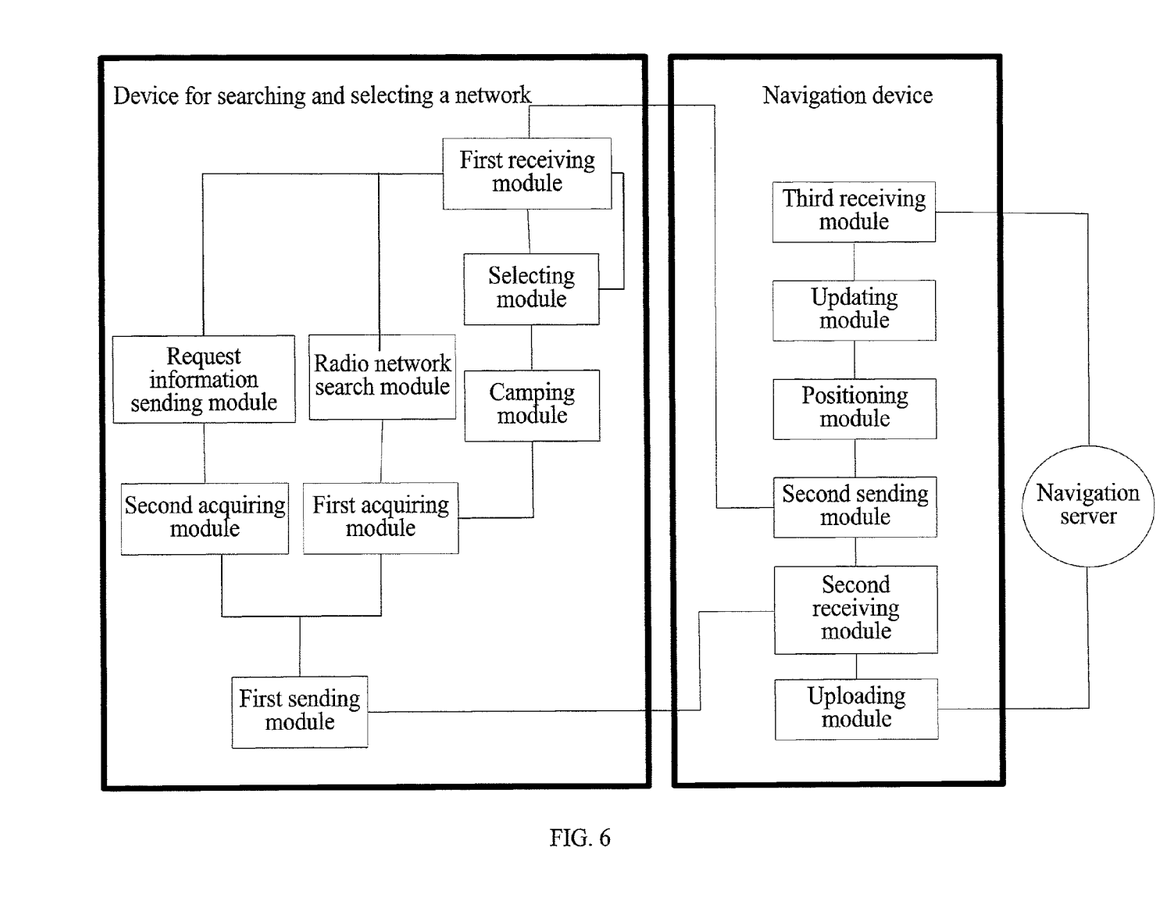
FIG. 6 is a schematic structural diagram of a system for searching and selecting a network according to Embodiment 5 of the present invention.

An embodiment of the present invention provides a system for searching and selecting a network. As shown in FIG. 6, this system includes: the device for searching and selecting a network according to Embodiment 3 and the navigation device according to Embodiment 4.

Persons of ordinary skill in the art should understand that all or a part of the processes of the methods in the embodiments of may be implemented by a program instructing relevant hardware. The program may be stored in a computer readable storage medium. When the program is run, the processes of the method in the embodiments are performed. The storage medium may be a magnetic disk, an optical disk, a Read-Only Memory (Read-Only Memory, ROM), a Random Access Memory (Read-Only Memory, RAM), and the like.

The foregoing descriptions are merely specific implementation manners of the present invention, but not intended to limit the protection scope of the present invention. Any variation or replacement that can be easily made by persons skilled in the art without departing from the technical scope disclosed by the present invention shall fall within the protection scope of the present invention. Therefore, the protection scope of the present invention shall be subject to the appended claims.

What is claimed is:

1. A method for searching and selecting a network, wherein the method comprises:
   acquiring by a device for searching and selecting a network in a terminal, information about a current location of the terminal and radio network information about the current location;
   if it is obtained according to the radio network information about the current location that radio networks exist at the current location:
      selecting by the device for searching and selecting the network, a network among all the radio networks that exist at the current location of the terminal according to a preset network selection rule, wherein:
         the preset network selection rule comprises determining an area set by a user according to an instruction entered by the user, and selecting the network in at least one radio network existing in the area; and
      camping on the selected radio network;
   if it is obtained according to the radio network information about the current location that no radio network exists at the current location of the terminal:
   sending by the device for searching and selecting the network, a network search request information according to user trigger or automatically to a radio network search device in the terminal, wherein the radio network search device is configured to perform blind search for radio networks of a current cell and neighboring cells of the terminal, and acquire radio network information about the current location; and
   obtaining by the device for searching and selecting the network, blind search results of the information about the current location of the terminal and the radio network information about the current location sent by the radio network search device;
      wherein a data interface for information transmission between the device for searching and selecting the network and the radio network search device is an open standardized interface.

2. The method for searching and selecting a network according to claim 1, wherein the acquiring of the information about the current location of the terminal and the radio network information, about the current location comprises:
   receiving by the terminal, the information about the current location of the terminal and the radio network information about the current location sent by a navigation device according to user trigger or regularly, wherein the navigation device stores an electronic map of a specified area that comprises the current location and the radio network information which is mapped to the electronic map.

3. The method for searching and selecting a network according to claim 2, wherein the method comprises:
   after receiving the information about the current location of the terminal and the radio network information about the current location sent by a navigation device according to user trigger or regularly, sending network search request information to the radio network search device;
   obtaining the information about the current location of the terminal and the radio network information about the current location sent by the radio network search device; and
   if the radio network information sent by the radio network search device and the radio network information about the current location sent by the navigation device are inconsistent, sending the information about the current location of the terminal and the radio network information about the current location sent by the radio network search device to the navigation device, so that the navigation device sends the information about the current location of the terminal and the radio network information about the current location sent by the radio network search device to a navigation server.

4. The method for searching and selecting a network according to of claim 1, wherein the method comprises:
   if it is obtained according to the radio network information about the current location that no radio network exists at the current location of the terminal, receiving the information about the current location of the terminal and the radio network information about the current location sent by the navigation device upon a next user trigger or in a next period.

5. The method for searching and selecting a network according to claim 1, wherein the method further comprises:
   if it is obtained according to the radio network information about the current location sent by the radio network search device that the radio networks exist at the current location of the terminal: sending the information about the current location of the terminal and the radio network information about the current location sent by the radio network search device to the navigation device, so that the navigation device sends the information about the current location of the terminal and the radio network information about the current location sent by the radio network search device to a navigation server, wherein the navigation server is configured to receive the information about the current location of the terminal and the radio network information about the current location sent by the radio network search device that are sent by the navigation device, and send radio network update information to the navigation device.

6. A method for searching and selecting a network, comprising:
   before acquiring information about a current location of a terminal and radio network information about current location from a stored electronic map according to terminal trigger or regularly, the method further comprises:
   receiving radio network update information sent by a navigation server, wherein the radio network update information comprises radio network information after change about a location whose radio network changes; and
   updating radio network information in the stored electronic map according to the radio network update information;
   subsequent to the updating of the radio network information in the stored electronic map, acquiring information about the current location of the terminal and the radio network information about the current location from the stored electronic map according to terminal trigger or regularly, wherein the electronic map comprises a specified area of the current location of the terminal; and
   sending the information about the current location of the terminal and the radio network information about the current location to the terminal.

7. The method for searching and selecting a network according to claim 6, wherein after sending the information about the current location of the terminal and the radio network information about the current location to the terminal, the method further comprises:
   receiving radio network information sent by the terminal; and sending the information about the current location of the terminal and the radio network information sent by the terminal to a navigation server.

8. A device for searching and selecting a network, comprising:
- a first receiving module, configured to acquire information about a current location of a terminal and radio network information about the current location;
- a selecting module, configured to: if it is obtained that multiple radio networks exist at the current location of the terminal according to the radio network information about the current location, select a network among all radio networks that exist at the current location of the terminal according to a preset network selection rule, wherein:
    - the preset network selection rule comprises determining an area set by a user according to an instruction entered by the user, and selecting the network in at least one radio network existing in the area; and
    - camping on the selected radio network;
- if it is obtained according to the radio network information about the current location that no radio network exists at the current location of the terminal:
- sending by the device for searching and selecting the network, a network search request information according to user trigger or automatically to a radio network search device in the terminal, wherein the radio network search device is configured to perform blind search for radio networks of a current cell and neighboring cells of the terminal, and acquire radio network information about the current location; and
- obtaining by the device for searching and selecting the network, blind search results of the information about the current location of the terminal and the radio network information about the current location sent by the radio network search device;
- wherein a data interface for information transmission between the device for searching and selecting the network and the radio network search device is an open standardized interface.

9. The device for searching and selecting a network according to claim 8, wherein the first receiving module is further configured to receive the information about the current location of the terminal and the radio network information about the current location sent by a navigation device according to user trigger or regularly, wherein the navigation device stores an electronic map of a specified area that comprises the location and radio network information mapping to the electronic map.

10. The device for searching and selecting a network according to claim 9, comprising:
- a request information sending module, configured to: after receiving the information about the current location of the terminal and the radio network information about the current location sent by a navigation device according to user trigger or regularly, send network search request information to the radio network search device; and
- a second acquiring module, configured to obtain the information about the current location of the terminal and the radio network information about the current location sent by the radio network search device.

11. The device for searching and selecting a network according to claim 8, comprising:
- a radio network search module, configured to: if it is obtained according to the radio network information about the current location that no radio network exists at the current location of the terminal, send a network search request information according to user trigger or automatically to a radio network search device, wherein the radio network search device is configured to perform blind search for radio networks of a current cell and neighboring cells of the terminal, and acquire radio network information about the current location; and
- a first acquiring module, configured to obtain the information about the current location of the terminal and the radio network information about the current location sent by the radio network search device.

12. The device for searching and selecting a network according to claim 11, wherein the device for searching and selecting a network further comprises:
- a first sending module, configured to: if radio networks exist at the current location of the terminal, send the information about the current location of the terminal and the radio network information about the current location sent by the radio network search device to a navigation device, so that the navigation device sends the information about the current location of the terminal and the radio network information about the current location sent by the radio network search device to a navigation server, wherein the navigation server is configured to receive the information about the current location of the terminal and the radio network information about the current location sent by the radio network search device that are sent by the navigation device, and send radio network update information to the navigation device; or configured to: if the radio network information sent by the radio network search device and the radio network information about the current location sent by the navigation device are inconsistent, send the information about the current location of the terminal and the radio network information about the current location sent by the radio network search device to the navigation device, so that the navigation device sends the information about the current location of the terminal and the radio network information about the current location sent by the radio network search device to a navigation server.

13. The device for searching and selecting a network according to claim 8, comprising:
- if it is obtained according to the radio network information about the current location that no radio network exists at the current location of the terminal, receiving the information about the current location of the terminal and the radio network information about the current location sent by the navigation device upon a next user trigger or in a next period.

14. A navigation device, comprising:
- a positioning module, configured to: acquire information about a current location of a terminal and radio network information about the current location from a stored electronic map according to terminal trigger or regularly, wherein the electronic map comprises a specified area of the current location of the terminal;
- a second sending module, configured to send the information about the current location of the terminal and the radio network information about the current location to the terminal;
- a third receiving module, configured to: before the acquiring information about a current location of a terminal and radio network information about the current location from a stored electronic map according to terminal trigger or regularly, receive radio network update information sent by a navigation server, wherein the radio network update information comprises radio network information after change about a location whose radio network changes; and an updating module, configured to update radio network information in the stored electronic map according to the radio network update information.

15. The navigation device according to claim 14, further comprising:

a second receiving module, configured to: after the sending the information about the current location of the terminal and the radio network information about the current location to the terminal, receive radio network information sent by the device for searching and selecting a network; and an uploading module, configured to send the information about the current location of the terminal and the radio network information sent by the terminal to a navigation server.

* * * * *